United States Patent
Li et al.

(10) Patent No.: US 10,723,294 B2
(45) Date of Patent: Jul. 28, 2020

(54) HIGH FREQUENCY VOLTAGE INJECTION-BASED CABLE SWAP DETECTION

(71) Applicant: Ford Global Technologies, LLC, Dearborn, MI (US)

(72) Inventors: Silong Li, Canton, MI (US); Wei Xu, Canton, MI (US); Jiyao Wang, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/034,091

(22) Filed: Jul. 12, 2018

(65) Prior Publication Data

US 2020/0017039 A1 Jan. 16, 2020

(51) Int. Cl.
| | | |
|---|---|---|
| *H02P 6/28* | (2016.01) | |
| *B60R 16/023* | (2006.01) | |
| *H02P 6/18* | (2016.01) | |
| *B60L 15/02* | (2006.01) | |
| *B60L 15/20* | (2006.01) | |
| *H02P 21/14* | (2016.01) | |

(52) U.S. Cl.
CPC ........ *B60R 16/0232* (2013.01); *B60L 15/025* (2013.01); *B60L 15/20* (2013.01); *H02P 6/183* (2013.01); *H02P 6/28* (2016.02); *H02P 21/14* (2013.01); *B60L 2260/44* (2013.01)

(58) Field of Classification Search
CPC ........ B60L 15/20; B60L 15/025; B60L 50/16; B60L 2240/427; B60L 2240/429; B60L 2240/44

See application file for complete search history.

(56) References Cited

U.S. PATENT DOCUMENTS

| | | | |
|---|---|---|---|
| 8,624,531 B2 * | 1/2014 | Wu ........................ | G01R 31/04 318/400.02 |
| 8,896,248 B2 | 11/2014 | Becerra et al. | |
| 2015/0100187 A1 | 4/2015 | Light et al. | |
| 2015/0100264 A1 * | 4/2015 | Qian .................... | G01D 5/2046 702/94 |
| 2016/0161304 A1 * | 6/2016 | Son .......................... | G01D 3/08 324/207.12 |
| 2016/0268944 A1 * | 9/2016 | Xu .......................... | B60L 15/20 |

* cited by examiner

*Primary Examiner* — Rina I Duda
(74) *Attorney, Agent, or Firm* — David Kelley; Brooks Kushman PC (57) ABSTRACT

A vehicle includes a controller programmed to, responsive to injecting a high frequency voltage signal to an electric machine, determine an estimated negative sequence current phase associated with an electric machine current, and responsive to a rotor of the electric machine being at a predetermined rotor position, inject a pulse torque command to the electric machine and observe a speed change of the electric machine to determine a cable sequence.

5 Claims, 6 Drawing Sheets

HIGH FREQUENCY VOLTAGE INJECTION-BASED CABLE SWAP DETECTION

TECHNICAL FIELD

The present disclosure generally relates to cable swap detection for an electric machine. More specifically, the present disclosure is related to high frequency voltage injection-based cable swap detection for an electric machine.

BACKGROUND

A hybrid-electric or all-electric vehicle includes one or more electric machines that are used for vehicle propulsion. The electric machines operate with relatively large voltages and currents when compared to a traditional 12 Volt vehicle power system. A high voltage system may monitor the connection status of the electric machines. A typical electric machine may be a three-phase motor and include connection of three conductor/pins between the electric machine and a power inverter. The electric machine rotates in a direction that is based on a phase rotation sequence of the voltage or current applied to the conductors.

SUMMARY

In one or more embodiments of the present disclosure, a vehicle includes a controller programmed to, responsive to output of an electric machine to an injected voltage signal and a pulse torque command indicating a cable sequence matching a predetermined sequence, modify a default offset of a resolver associated with the electric machine to generate a modified offset and operate the electric machine and the resolver with the modified offset.

In one or more embodiments of the present disclosure, a vehicle includes an electric machine configured to rotate in a predetermined direction responsive to application of a predetermined phase rotation sequence, and a controller programmed to inject into the electric machine a voltage with the predetermined phase rotation sequence and output a signal indicative of a phase rotation sequence based on a comparison of predetermined negative sequence current phases and sequence current phases associated with a current caused by the voltage.

In one or more embodiments of the present disclosure, a method includes applying, by a controller, a voltage to an electric machine, operating, by the controller, the electric machine based on a phase rotation sequence derived from a comparison of predetermined negative sequence current phases and estimated negative sequence current phases associated with a current caused by the voltage, and applying, by the controller, a torque command to the electric machine responsive to a rotor being at predetermined locations.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for cable swap detection (CSD). More specifically, the present disclosure proposes a two-step high frequency voltage injection-based cable swap detection system and method.

Figure 1:
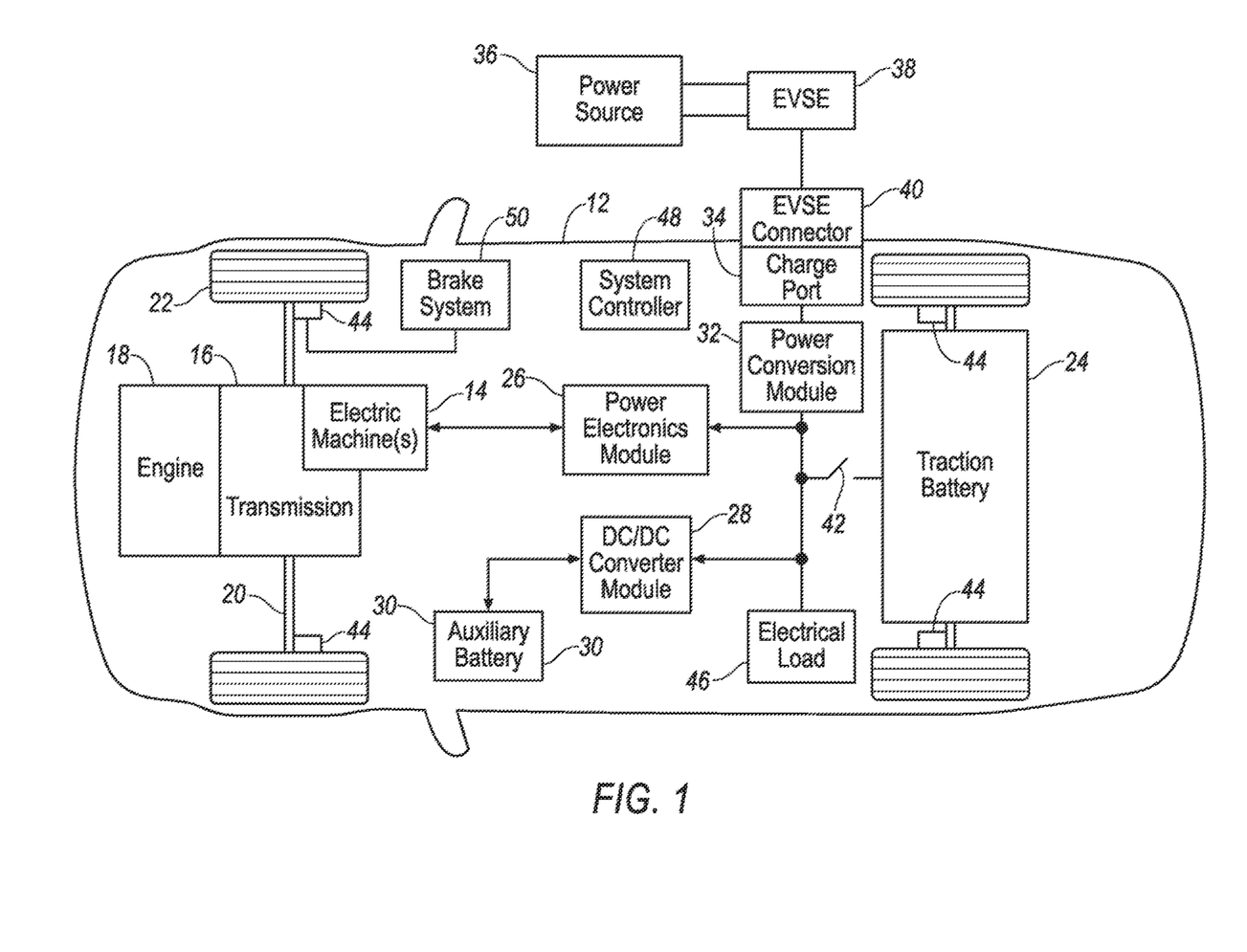
FIG. 1 illustrates an example block topology of a hybrid vehicle illustrating typical drivetrain and energy storage components of one embodiment of the present disclosure.

FIG. 1 illustrates a typical plug-in hybrid-electric vehicle (PHEV). A typical plug-in hybrid-electric vehicle 12 may comprise one or more electric machines (a.k.a. electric motors) 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 may provide propulsion and deceleration capability when the engine 18 is turned on or off. The electric machines 14 may also act as generators and may provide fuel economy benefits by recovering energy that would be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that may be used by the electric machines 14. A vehicle battery pack 24 may provide a high voltage DC output. The traction battery 24 may be electrically coupled to one or more power electronics modules 26. The power electronics module 26 may also be referred to as a power inverter. One or more contactors 42 may isolate the traction battery 24 from other components when opened and couple the traction battery 24 to other components when closed. The power electronics module 26 may also be electrically coupled to the electric machines 14 and provide the ability to bi-directionally transfer energy between the traction battery 24 and the electric machines 14. For example, a traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle may include a DC/DC converter module 28 that converts the high voltage DC output of the traction battery 24 to a low voltage DC supply that is compatible with other low-voltage vehicle loads. An output of the DCDC converter module 28 may be electrically coupled to an auxiliary battery 30 (e.g., 12V battery). Other high-voltage loads 46, such as compressors and electric heaters, may be coupled to the high-voltage output of the traction battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be an electrical power distribution network or grid as provided by an electric utility company. The external power source 36 may be electrically coupled to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interlace with the EVSE 38 to coordinate the delivery of power to the vehicle 12. The EVSE connector 40 may have pins that mate with corresponding recesses of the charge port 34. Alternatively, various components described as being electrically coupled may transfer power using a wireless inductive coupling.

One or more wheel brakes 44 may be provided for decelerating the vehicle 12 and preventing motion of the vehicle 12. The Wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN) or via discrete conductors. A system controller 48 may be present to coordinate the operation of the various components.

Figure 2:
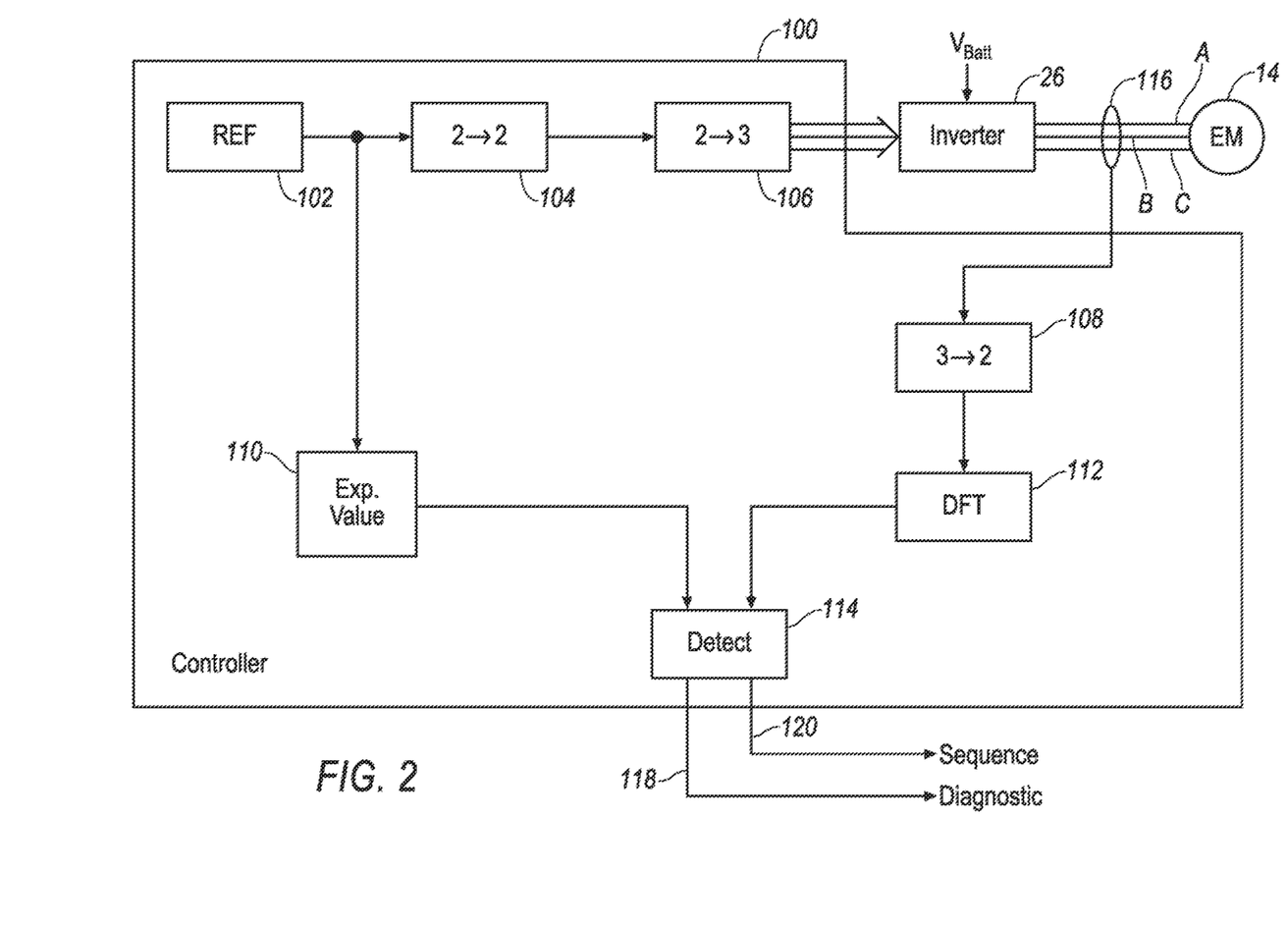
FIG. 2 illustrates a block diagram of an exemplary controls configuration for detecting a phase rotation sequence between an electric machine and a power inverter of one embodiment of the present disclosure.

The electric machine 14 may be coupled to the power electronics module 26 via one or more conductors. FIG. 2 illustrates a block diagram of control logic that may be implemented in a controller 100. The vehicle 12 may include one or more controllers 100 to control the power electronics module 26. The conductors may be part of a wiring harness between the electric machine 14 and the power electronics module 26. A three-phase electric machine 14 may have three conductors coupled to the power electronics module 26. As illustrated in FIG. 2, the three-phase electric machine 14 have three conductors A, B, and C coupled to the power electronics module 26. The controller 100 may implement a strategy to detect that the conductors are properly connected between the electric machine 14 and the power electronics module 26.

An electric machine 14 may be controlled via signals provided by the power electronics module 26 (also referred to as the power inverter). The torque output of the electric machine 14 may be controlled by controlling a current output of the power electronics module 26. The power electronics module 26 may convert a DC voltage input to an alternating three-phase voltage and current output to the electric machine 14.

The power electronics module 26 may be controlled to provide sinusoidal voltage and current signals to the electric machine 14. When the electric machine 14 is being controlled for propulsion, the frequency of the signals may be proportional to the rotational speed of the electric machine 14. When the electric machine 14 is not being used for propulsion, signals may be injected for the purpose of checking the wiring connection. The injected signals may have an amplitude and frequency that does not cause the electric machine 14 to rotate. The frequency of the injected signals may be selected to by a relatively high frequency that is greater than an expected operational frequency during propulsion. Further, the amplitude of the injected signals may be sufficiently small so as to minimize shock hazards and minimize rotation of the electric machine 14.

Before operating the electric machine 14 for propulsion, a sequence of operations may be performed to ensure that the electric machine 14 is coupled properly to the power electronics module 26. An electric machine 14 may be configured to rotate in a particular direction when a voltage or current having a particular phase rotation sequence is applied. The phase rotation sequence may define the relative phase angles between the signals applied to each of the conductors. A voltage may be applied to the terminals of the electric machine 14 to produce a current in the electric machine 14. The current may be a signal of relatively high frequency and relatively low amplitude in order to minimize any rotation or motion of the electric machine 14.

The controller 100 may be configured to adjust the voltage and current output of the power electronics module 26 at a predetermined switching frequency. The switching frequency may be the rate at which the states of switching devices within the power electronics module 26 are changed. As an example, a ratio of 10-20 between the switching frequency and infection frequency may be used here.

Field-oriented electric machine control may define an alternate coordinate system for controlling voltages and currents of the electric machine 14. The coordinate system selected allows for simpler control logic than the three-phase coordinate system of the electric machine 14. The selected coordinate system may transform the three-phase alternating voltage and currents into a coordinate system in which the voltages and currents are represented by DC voltages and currents. The transformation to DC values allows for more effective controls to be implemented.

The vehicle 12 may further include one or more current sensors 116 to measure current in one or more of the phases of the electric machine 14. In some configurations, two current sensors are utilized and the third phase current is calculated from the two measured currents. The controller 100 associated with the power electronics module 26 may sample the current sensors at a predetermined sampling rate. Measurement values for the phase currents of the electric machine 14 may be stored in controller memory for later computations.

The three phase values may be transformed into a two-axis coordinate system using one or more coordinate transformations. The three phase values may be measured or calculated values. For example, in field-oriented electric machine control, coordinate transformations, such as the Park and Clarke coordinate transformations, are well known. The output of one coordinate transformation may be a vector in a stationary two-axis reference frame. One possible transformation from the three-phase quantities is the Clarke transformation which may be expressed as $$\begin{bmatrix} X_\alpha \\ X_\beta \end{bmatrix} = \begin{bmatrix} 2/3 & -1/3 & -1/3 \\ 0 & 2/\sqrt{3} & -2/\sqrt{3} \end{bmatrix} \begin{bmatrix} X_a \\ X_b \\ X_c \end{bmatrix} \quad (1)$$

where $X_a$, $X_b$, and $X_c$ are the three-phase values which may represent a current or voltage.

The Clarke transformation converts a three-phase system into the stationary two-axis reference frame. For control purposes, it may be desired to perform calculations with respect to a two-axis reference frame that rotates with respect to the stationary frame. One possible transformation is the Park transformation which may be expressed as $$\begin{bmatrix} X_d \\ X_q \end{bmatrix} = \begin{bmatrix} \cos(\theta) & \sin(\theta) \\ -\sin(\theta) & \cos(\theta) \end{bmatrix} \begin{bmatrix} X_\alpha \\ X_\beta \end{bmatrix} \quad (2)$$

where θ is the angle of the rotating frame with respect to the stationary frame. The rotating reference frame proves useful for motor control purposes as a rotating reference frame may be chosen in which the d-axis and q-axis values behave as DC values instead of alternating values. For example, a current vector having a d-component and a q-component may be utilized for controlling the current in the electric machine 14. The d-component may represent a flux component, and the q-component may represent a torque component.

The torque of the electric machine 14 may be controlled by adjusting the d-component and the q-component of the voltage or current. A d-axis current controller may be implemented to adjust the d-component. The d-axis current controller may input an error between a reference d-axis current and the measured d-axis current (d-component). The d-axis current controller may output a d-component voltage command that may achieve the reference d-axis current. A q-axis current controller may be implemented to adjust the q-component. The q-axis current controller may input an error between a reference q-axis current and the measured q-axis current (q-component). The q-axis current controller may output a q-component voltage command that may achieve the reference q-axis current.

The advantage of the rotating reference frame is evident when considering a three-phase sinusoid having a constant amplitude and frequency. In the stationary two-axis reference frame, the $X_\alpha$ and $X_\beta$ components will vary at the frequency of the sinusoidal signal. The same signal may be represented in a rotating reference frame that rotates at the same constant frequency. In the rotating reference frame, the $X_d$ and $X_q$ components will appear to be constant values.

Quantities in the rotating reference frame may be returned to the stationary reference frame by the inverse of the Park transformation which may be expressed as $$\begin{bmatrix} X_\alpha \\ X_\beta \end{bmatrix} = \begin{bmatrix} \cos(\theta) & -\sin(\theta) \\ \sin(\theta) & \cos(\theta) \end{bmatrix} \begin{bmatrix} X_d \\ X_q \end{bmatrix} \quad (3)$$

A quantity in the stationary two-axis reference frame may be returned to the three-phase frame using the inverse of the Clarke transformation Which may be expressed as $$\begin{bmatrix} X_a \\ X_b \\ X_c \end{bmatrix} = \begin{bmatrix} 1 & 0 \\ -1/2 & \sqrt{3}/2 \\ -1/2 & -\sqrt{3}/2 \end{bmatrix} \begin{bmatrix} X_\alpha \\ X_\beta \end{bmatrix} \quad (4)$$

The description above represents one possible coordinate transformation scheme. Other transformations are possible. In actual implementation, the transformation matrices may be combined to reduce the number of computations required.

The electric machine 14 may include a stator and a rotor. The power electronics module 26 may cause a current to flow in the stator windings. The permanent magnets on the rotor may cause a magnet field. The resulting interaction between the stator and rotor fields may cause a torque on the rotor. The torque may cause the rotor to increase or decrease rotational speed.

In some configurations, the controller 100 may be a component of the inverter 26. A reference voltage 102 may be defined and injected into the electrical machine 14. The reference voltage may be a high-frequency low-amplitude voltage waveform. The reference voltage 102 may be injected under conditions in which an output shaft of the electric machine 14 is not already rotating and the electric machine 14 is not otherwise being controlled with current.

The controller 100 may monitor a signal from a position sensor coupled to the electric machine 14 to determine if the output shaft of the electric machine 14 is rotating. The output shaft of the electric machine 14 may be considered to be stationary if the speed of the electric machine 14 is less than a predetermined speed or approximately zero.

The reference voltage 102 may be injected during a power-on condition. The power-on condition may include a period of time immediately following an ignition key cycle. This period of time would be expected to be while the vehicle 12 is in a standstill condition. The standstill condition may be when a speed of the vehicle 12 is approximately zero. The reference voltage injection 102 may also be generated after a service procedure as a result of a diagnostic command received from a service tool.

The injection reference voltage 102 in the stationary reference frame may be expressed as $$V_{HFI} = V_c e^{j\omega_c t} \qquad (5)$$

where $V_c$ and $\omega_c$ represent the amplitude and frequency of the rotating voltage vector. In the stationary reference frame, the injection voltage may be a vector of magnitude $V_c$ that rotates at the frequency $\omega_c$. The $V_\alpha$ component may be $V_c \cos(\omega_c t)$ and the $V_\beta$ component may be $V_c \sin(\omega_c t)$.

The stationary reference frame may be timber transformed into a reference frame that rotates at the frequency of the injection voltage. The transformation to the injection signal reference frame may be based on the following equations (similar to Equation (2)):

$$V_{q\_HFI} = V_\beta \cos(\theta_c) - V_\alpha \sin(\theta_c) \qquad (6)$$

$$V_{d\_HFI} = V_\beta \sin(\theta_c) + V_\alpha \cos(\theta_c) \qquad (7)$$

where $\theta_c$ represents an angular position of the injection voltage which may be derived from the injection voltage frequency and the sampling time. This operation may be represented by block 104. Alternatively, the injection voltage from stationary referenced frame may be directly transform to three phase voltage using equation (4).

Equations (6) and (7) may be used to convert the injection voltage from the stationary reference frame to a reference frame that rotates with the injection voltage (also referred to as the injection voltage reference frame). In the injection voltage reference frame, the injection voltage of equation (5) may appear as a vector having a fixed d-component and a fixed q-component. Also note that the three phase currents may be transformed to the injection voltage reference frame using a combined transformation. The d-component voltage and the q-component voltage commands may represent a $V_{dq}$ voltage command vector.

The dq-coordinates of the stator reference frame may be transformed to the three-phase voltages using the inverse Clarke transformation (represented by block 106). Note that the transformation in blocks 104 and 106 may be combined into one step in which the operations are combined to yield a transformation from the stationary reference frame to the three-phase values. The three-phase voltages will differ in phase from one another according to the phase rotation sequence.

The three phase voltage commands may be provided to the inverter 26. The inverter 26 may control a pulse width modulated (PWM) output signal to associated switching devices to control the voltage of each phase according to the voltage commands. The resulting voltages may cause current to flow in the three phases of the electric machine 14. The current that flows in the electric machine 14 may depend on the magnitude and frequency of the injection voltage and the impedance of the electric machine 14.

Three-phase voltages and currents may be described by a positive sequence component, a negative sequence component, and a zero sequence component. The positive sequence voltage or current will have a magnitude and frequency based on the three-phase voltage or current. A vector representing the positive sequence component will rotate in a first direction. The negative sequence voltage or current will have magnitude and frequency based on the three-phase voltage or current. However, a vector representing the negative sequence component will rotate in a direction opposite to the first direction at which the positive sequence vector rotates.

The resulting current in each phase may be measured using the current sensors 116 and converted to the stationary reference frame as described above. The resulting current due to the injection voltage may be expressed as the sum of the positive sequence voltage, the negative sequence voltage, and the zero sequence voltage. The sum may be converted to the dq-coordinate system as described above. The transformation from three-phase to two-phase is represented by block 108. The current response to the injected voltage has saliency information embedded and may be represented as $$I_{dqs}{}^s = I_{cp} e^{j(\omega_c t + \varphi_{cp})} + I_{cn} e^{j(-\omega_c t + \varphi_{cn})} \qquad (8)$$

where $I_{cp}$ and $I_{cn}$ represent a magnitude of the positive and negative sequence currents respectively, and $\varphi_{cp}$ and $\varphi_{cn}$ represent phase of the positive and negative sequence current response.

The phase of the negative sequence current components may be estimated using a discrete Fourier transform (DFT), represented by block 112, on the current measurement signal. The estimated phase of the negative sequence currents may be compared to expected values derived from parameters of the electric machine 14 and parameters of the injected voltage.

For the negative sequence current, the DFT 112 may be expressed as $$X_k = \sum_{n=0}^{N-1} x_n * e^{-i2\pi f_c T_s} \qquad (9)$$

where N represents the number of sample used DFT determined by the requirement of the detection. In general, the more samples taken the more accurate of the DFT results are on the negative sequence. However, more samples would require more calculation time that delays the detection. $f_c$ represents the frequency of the injected signal, positive sequence: $f_c$, negative sequence: $-f_c$. $x_n$ represents the sampled high frequency current complex vector $I_{qds}$. $X_k$ represents the output of the DFT for negative sequence phase calculation. Table 1 below illustrates an example MATLAB code for equation (9) presented above.

TABLE 1

MATLAB code for post-processing current response using DFT

```
for i = 0:L−1
  % negative sequence
  Xneg(i+1) = Xneg_km1 + Iqds(i+1) *exp(−2*pi*li*i*−fc*Ts);
  Xneg_km1 = Xneg(i+1);
  Xl (i+1) = Xneg(i+1)/(i+1);
End
```

In a three-phase system, the phases of the voltage are separated by 120 degrees. The phases may be labeled as A, B, and C. For example, a normal phase rotation sequence may be denoted as ABC, where A, B, and C denote one of the three-phase signals. A normal phase rotation sequence, ABC, may be such that the peak value of phase A is observed first, the peak value of phase B is observed a time corresponding to 120 degrees later, and the peak value of phase C may be observed at a time corresponding to 120 degrees later that the peak of phase B is observed.

In the event of a swapped cable, the system may no longer be connected with the normal ABC phase rotation sequence. For example, if the phase B and phase C connections are swapped, there is a phase rotation sequence of ACB. In this case, the observation times of the peak values of the phase B and phase C waveforms are swapped. The phase rotation sequence of the signals provided to the electric machine 14 determines the direction of rotation of the electric machine 14. Therefore, an electric machine 14 connected with a phase rotation sequence of ABC will rotate in a direction opposite to one connected with a phase rotation sequence of ACB when operated with the same voltage waveform. In some case, the electric machine 14 may not rotate when the wrong sequence is input. In an alternative example, if the phase A is swapped to phase C connection, the phase B is swapped to phase A connection, and the phase C is swapped to phase B connection, there is a phase rotation sequence of CAB. In this case, the electric machine 14 may rotate in the correct direction, but due to the offset of phase, the electric machine may not be control precisely as intended.

It is apparent that a swapped connection may alter the phase rotation sequence and may cause the electric machine 14 to respond differently than intended. Such a condition may have a serious impact on performance and safety. There is a potential that the phase rotation sequence could be altered during a service operation or during production. A robust system design should be able to at least detect an improper phase rotation sequence and either compensate for this situation or inhibit operation of the electric machine 14 until remedied.

The output of each DFT 112 may be the phase of the negative sequence current response. The phase of the negative sequence current may be predicted as represented by block 110. Assuming a normal connection (e.g., ABC sequence, no swap) between the power inverter 26 and the electric machine 14, the expected phase of the negative sequence current may be expressed as $$\varphi_{cn} = 2\theta_e - \frac{\pi}{2} \qquad (10)$$

where $\theta_e$ represents the rotor position.

In the situation in which three-phase connections between the power inverter 26 and the electric machine 14 are swapped, the phase of the negative sequence current may have different values. The phase of the negative sequence current for cables connected in an ACB arrangement is:

$$\varphi_{cn} = -2\theta_e - \frac{\pi}{2} \qquad (11)$$

The phase of the negative sequence current for cables connected in an BCA arrangement is:

$$\varphi_{cn} = 2\left(\theta_e - \frac{2\pi}{3}\right) - \frac{\pi}{2} \qquad (12)$$

The phase of the negative sequence current for cables connected in an BAC arrangement is:

$$\varphi_{cn} = -2\left(\theta_e - \frac{2\pi}{3}\right) - \frac{\pi}{2} \qquad (13)$$

The phase of the negative sequence current for cables connected in an CAB arrangement is:

$$\varphi_{cn} = 2\left(\theta_e + \frac{2\pi}{3}\right) - \frac{\pi}{3} \qquad (14)$$

The phase of the negative sequence current for cables connected in an CBA arrangement is:

$$\varphi_{cn} = -2\left(\theta_e + \frac{2\pi}{3}\right) - \frac{\pi}{2} \qquad (15)$$

Figure 3:
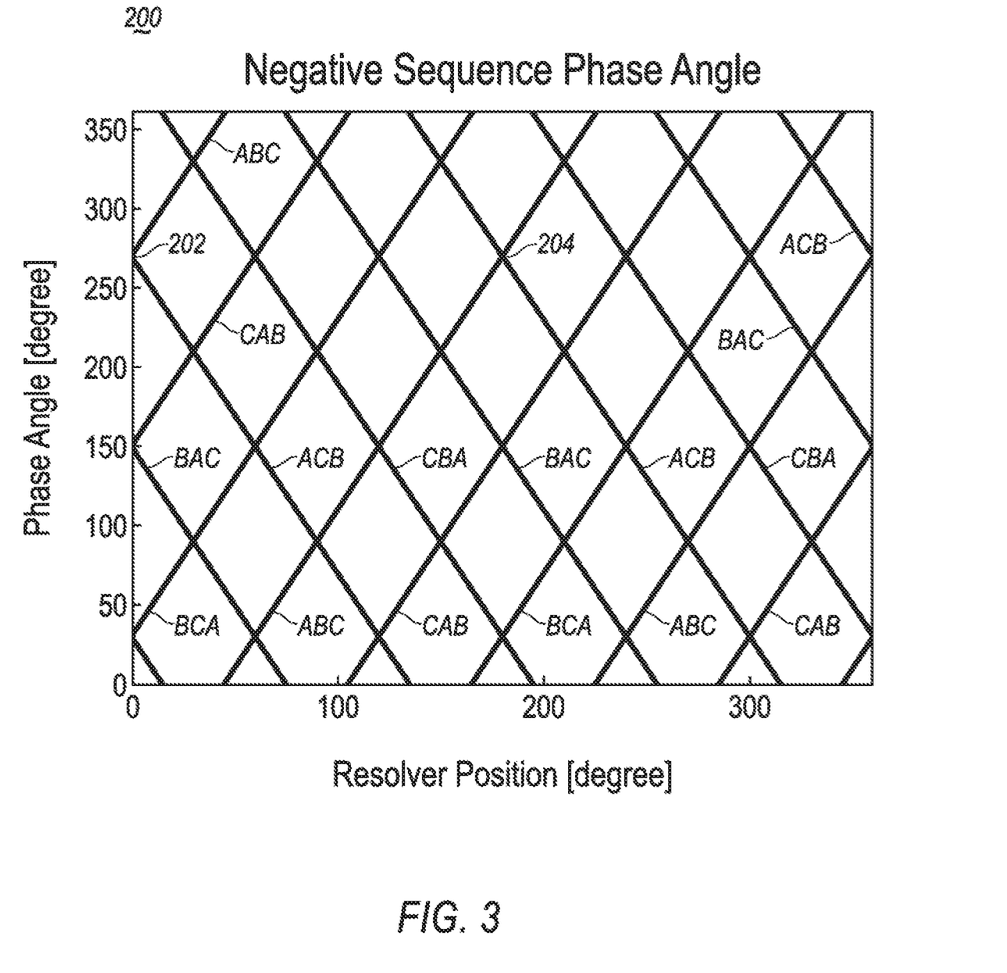
FIG. 3 illustrates a relationship diagram of calculated phase of negative sequence under six different cable swap situations as a function of measured resolver position of one embodiment of the present disclosure.

FIG. 3 illustrates a relationship diagram 200 of calculated phase of negative sequence under six different cable swap situations as a function of measured resolver position of one embodiment of the present disclosure. After the high frequency voltage signal is injected into the electric machine 14, the cable swap can be determined and different types/cases of cable swap can be distinguished under many conditions. However, as illustrated in FIG. 2, the phase of negative sequence current response of different cable swap cases coincides with each other when rotor position equals to a multiple of 30° (k*30° (k=1, 2, . . . , 12)). For instance, the phase of ABC case coincides with ACB case when rotor position equals to 0° at 202 and 180° at 204. It is worth to note that phase of negative sequence current response of ABC, BCA, CAB (correct phase sequence) never coincide with each other. Similarly, phase of negative sequence current response of ACB, CBA, BAC (incorrect phase sequence) never coincide with each other. Therefore, in order to determine cable swap and distinguish different types of cable swap, it is sufficient to distinguish the correct phase sequence from the incorrect phase sequence.

In cases when the rotor position is not equal to k*30° (k=1, 2, . . . , 12), the cable swap detection is complete, and there is no need to go to the step two. Otherwise, the process goes to the second step to further determine the case of cable swap by injecting a short pulse torque command into the electric machine 14. The speed of electric machine 14 and/or movement of vehicle 12 are observed as detection criteria. When the cable swap cases are ABC, BCA, or CAB, the electric machine 14 may rotate and the vehicle may move. Otherwise, when the cable swaps cases are BAC, ACB, or CBA, the electric machine does not rotate. In this way, the specific case of cable swap may be determined.

Figure 4:
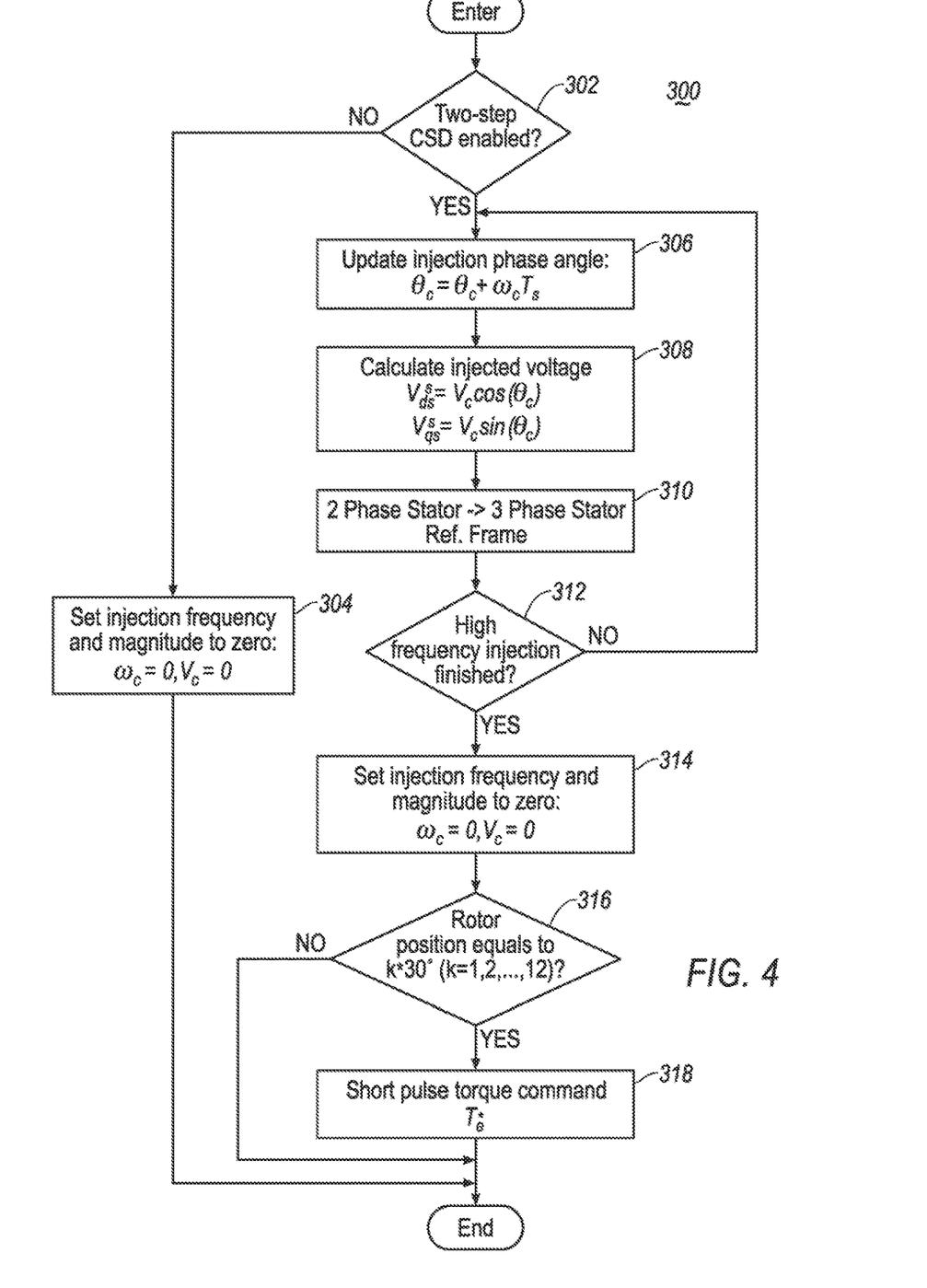
FIG. 4 illustrates a process diagram for an injection routine of the cable swap detection of one embodiment of the present disclosure.

Referring to FIG. 4, a process diagram 300 for an injection routine of the cable swap detection of one embodiment of the present disclosure is illustrated. The injection routine may inject the injection voltage into the electric machine 14. The controller 100 may perform operation 302 to determine if the two-step cable swap detection logic is enabled or allowed to be performed. One condition may be that the electric machine 14 is not otherwise commanded and is at zero speed. If it is determined that the detection is not enabled, operation 304 may be performed to set the injection voltage to zero.

If at operation 302, the controller 100 determines that the two-step CSD is enabled, the process proceed to operation 306 to begin with the first step. At operation 306, the controller 100 updates the injection phase angle:

$$\theta_c = \theta_c + \omega_c T_s \quad (16)$$

At operation 308, the controller 100 calculates the injected voltage using the following equations:

$$V_{ds}^s = V_c \cos(\omega_c) \quad (17)$$

$$V_{qs}^s = V_c \sin(\theta_c) \quad (18)$$

At operation 310, the controller 100 transforms the 2-phase stator frame into a 3-phase stator reference frame to perform the high frequency voltage injection. At operation 312, the controller 100 checks whether the high frequency injection has finished. If the high frequency voltage injection has not been finished, the process returns to operation 306. Otherwise, if the high frequency voltage injection is finished, the process proceeds to operation 314, and the controller 100 sets the injection frequency and magnitude to zero: $\omega_c=0$, $V_c=0$.

At operation 316, the controller 100 verifies if the rotor position equals to any multiple of 30° (i.e, k*30° (k=1, 2, ..., 12)). If the answer is a no, as discussed above, it will be unnecessary to perform the second step and the process ends. If the controller 100 determines that the rotor position is equals to a multiple of 30°, the second step will be necessary. The process proceeds to operation 318 and the controller 100 injects a short pulse torque command T*$_e$ (or a short pulse current command) into the electric machine 14. After operation 318, the controller 100 ends the injection routine. The process may be continually repeated at the specified sampling rate.

Figure 5A:
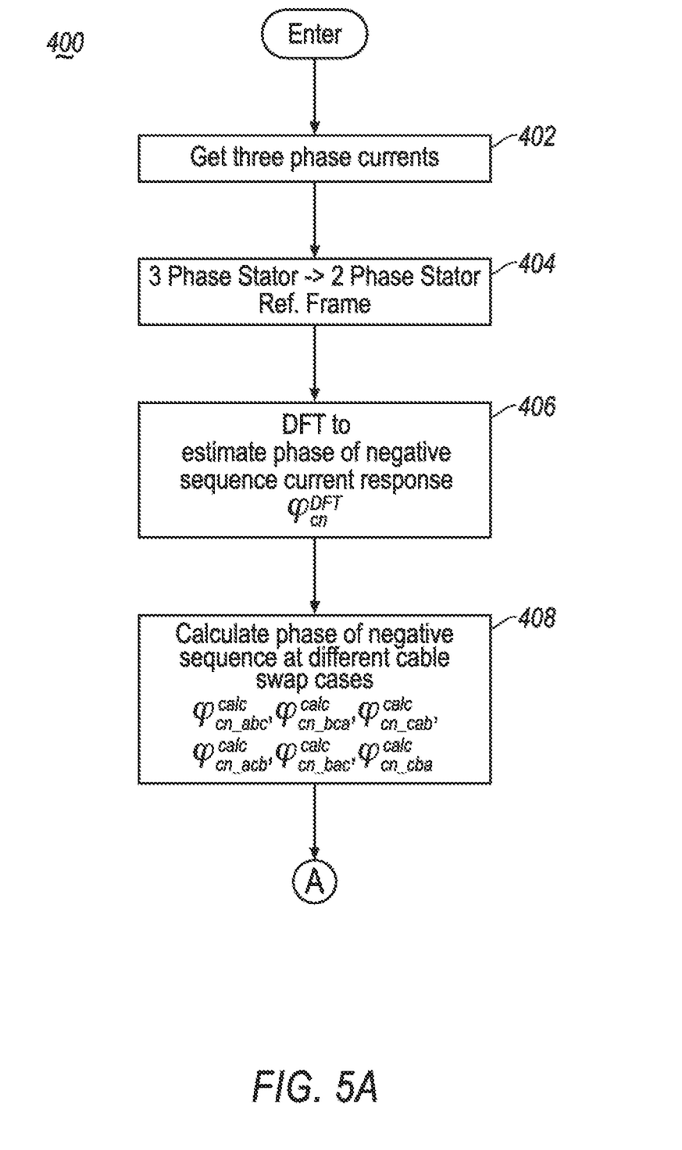
FIGS. 5A and 5B illustrate a process diagram for a detection routine of the cable swap detection of one embodiment of the present disclosure.
Figure 5B:
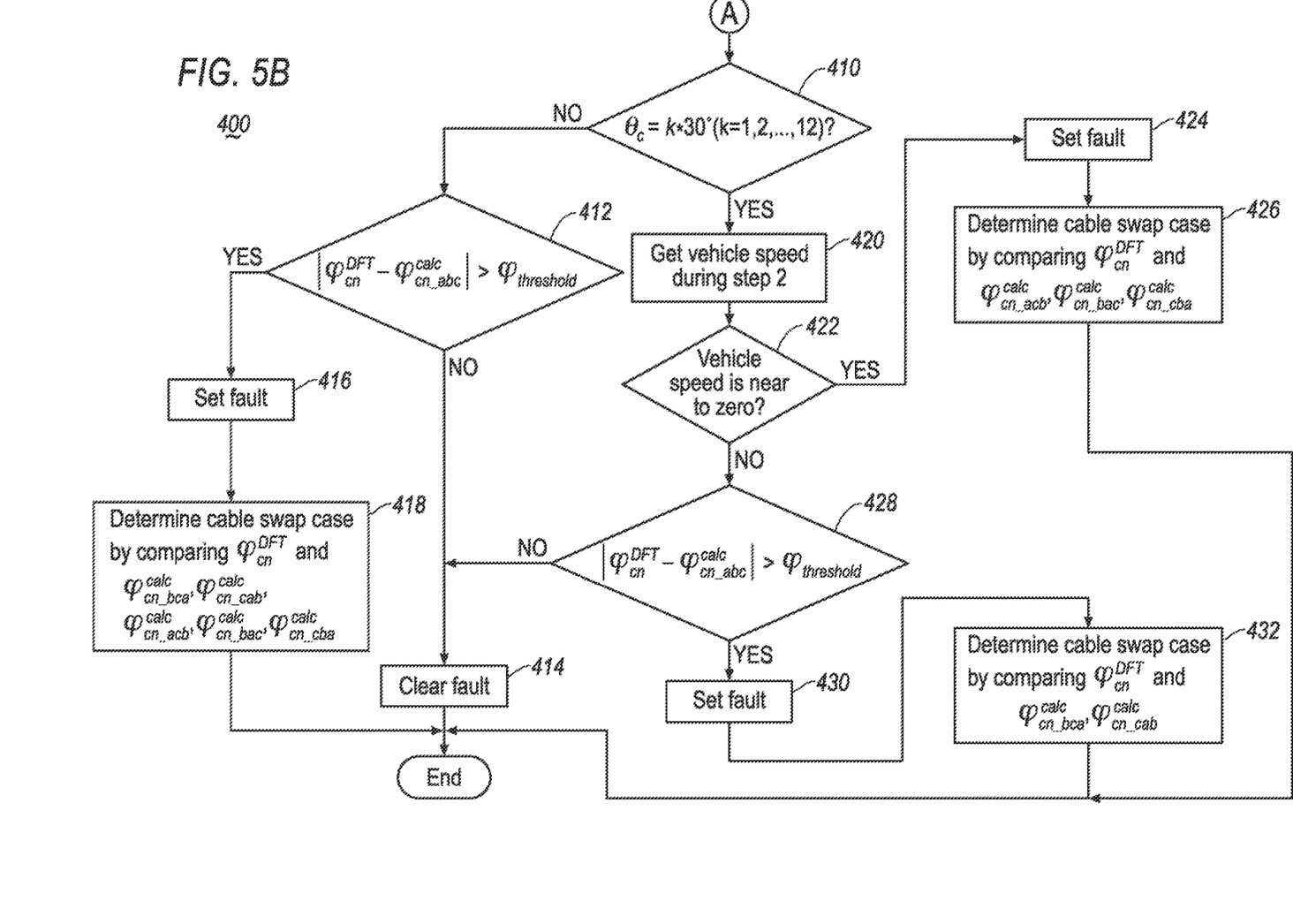

Referring to FIG. 5, a process diagram 400 for a detection routine of the cable swap detection of one embodiment of the present disclosure is illustrated. At operation 402, the controller 100 obtains the 3-phase current at each pin A, B, and C of the electric machine 14 using the sensors 116. At operation 404, the controller 100 transforms the 3-phase stator frame into a 2-phase stator reference frame. At operation 406, the controller 100 performs a DFT to estimate the phase of the negative sequence current response $\varphi_{cn}^{DFT}$. An example MATLAB program code to perform the DFT is illustrated in Table 1 above. At operation 408, the controller 100 calculates the phase of the negative sequence at different cable swap cases using equations (10)-(15): $\varphi_{cn\_abc}^{calc}$, $\varphi_{cn\_bca}^{calc}$, $\varphi_{cn\_cab}^{calc}$, $\varphi_{cn\_acb}^{calc}$, $\varphi_{cn\_bac}^{calc}$, and $\varphi_{cn\_cba}^{calc}$.

At operation 410, the controller 100 determines whether the rotor position $\theta_e$ of the electric machine 14 is at a multiple of 30° ($\theta_e=k*30°$ (k=1, 2, ..., 12)). If the answer is a no, the process proceeds to operation 412 and the controller 100 determines if the absolute value of the difference between the phase of the negative sequence current response $\varphi_{cn}^{DFT}$ estimated at operation 406 and the phase of the negative sequence at the correct case $\varphi_{cn\_abc}^{calc}$ (i.e. ABC, no swap) is greater than a predetermined threshold represented by the following equation:

$$|\varphi_{cn}^{DFT} - \varphi_{cn\_abc}^{calc}| > \varphi_{threshold} \quad (19)$$

If the answer for operation 412 is a no, the processed proceeds to operation 414 and the controller 100 clears any fault, and the process ends. If the answer for operation 412 is a yes, the process proceeds to operation 416 and the controller 100 sets a fault indicative of a detection of cable swap. Next, the process proceeds to operation 418 to determine the specific type/case of the cable swap by comparing the phase of the negative sequence current response $\varphi_{cn}^{DFT}$ with each phase of the negative sequence at the swapped cases $\varphi_{cn\_bca}^{calc}$, $\varphi_{cn\_cab}^{calc}$, $\varphi_{cn\_acb}^{calc}$, $\varphi_{cn\_bac}^{calc}$, and $\varphi_{cn\_cba}^{calc}$.

If at operation 410, the controller 100 determines that the rotor position $\theta_e$ of the electric machine 14 is at a multiple of 30°, the process proceeds to operation 420 and the controller 100 determines the speed of the vehicle 102 during the second step when the short pulse torque command T*$_e$ is injected at operation 318 in FIG. 3. At operation 422, if the vehicle speed is within a preset threshold to zero, the process proceeds to operation 424 and the controller 100 sets a fault indicative of a detection of cable swap. At operation 426, the controller 100 determines the cable swap case by comparing the phase of the negative sequence current response $\varphi_{cn}^{DFT}$ with the phase of the negative sequence of $\varphi_{cn\_acb}^{calc}$, $\varphi_{cn\_bac}^{calc}$, and $\varphi_{cn\_cba}^{calc}$.

If at operation 422, the controller 100 determines that the vehicle speed is not within a preset threshold to zero, the process proceeds to operation 428. Operation 428 is essentially the same as operation 412 wherein the controller 100 determines if the absolute value of the difference between the phase of the negative sequence current response $\varphi_{cn}^{DFT}$ and the phase of the negative sequence at the correct case $\varphi_{cn\_abc}^{calc}$ is greater than a predetermined threshold using equation (19). If the answer is a no, the process proceeds to operation 414. Otherwise, the process proceeds to operation 432 and the controller 100 determines the cable swap case by comparing the phase of the negative sequence current response $\varphi_{cn}^{DFT}$ with the phase of the negative sequence $\varphi_{cn\_bca}^{calc}$ and $\varphi_{cn\_cab}^{calc}$.

If a cable swap is detected, the cable swapped diagnostic may store a diagnostic trouble code (DTC) in the non-volatile memory of the controller. The cable swapped diagnostic may cause the power electronics module 26 to disable outputs to the affected electric machine 14. The disabling of the output may prevent voltage and current from being applied at the output of the power electronics module 26 for propulsion purposes. The cable swapped diagnostic may be indicated to the operator via a lamp or a warning message in a display.

The phase rotation sequence may be output and utilized to alter the control of the electric machine 14. The voltages and currents applied to the electric machine 14 may be modified to compensate for the phase rotation sequence. In this manner, rotation of the electric machine may still be maintained in the expected direction. The power inverter 26 may be configured to adjust the relative phases of the output voltages to compensate for the swapped connection to the electric machine 14.

To adjust and compensate the relative phases of the output voltage correctly, the positive phase sequence may be divided into two directions: counter-clockwise (CCW) direction, and clockwise (CW) direction. In general, a CCW type cable swap can be compensated by modifying the resolver offset value; a CW type cable swap can be compensated by exchanging the order of two phases in software.

TABLE 2

Effects of different high voltage cable misconnection

| | Motor-ISC Terminal 3-Phase | | | Effect | | |
|---|---|---|---|---|---|---|
| | | | | Positive Phase Sequence Direction | Equivalent Rotor Position (deg) | Resolver Offset Shift (deg) |
| | A | B | C | | | |
| Case 1 | A | B | C | CCW | $\theta_e$ | 0 |
| Case 2 | B | C | A | CCW | $\theta_e - \frac{2\pi}{3}$ | $-\frac{2\pi}{3}$ |
| Case 3 | C | A | B | CCW | $\theta_e + \frac{2\pi}{3}$ | $\frac{2\pi}{3}$ |
| Case 4 | A | C | B | CW | $-\theta_e$ | $-2\theta_e$ |
| Case 5 | C | B | A | CW | $-\theta_e - \frac{2\pi}{3}$ | $-2\theta_e - \frac{2\pi}{3}$ |
| Case 6 | B | A | C | CW | $-\theta_e + \frac{2\pi}{3}$ | $-2\theta_e + \frac{2\pi}{3}$ |

Referring to Table 2 above, effects of different high voltage cable swap cases are illustrated. For the cases ABC (no swap), BCA, and CAB, the positive phase sequence direction is CCW. In contrast, for cases ACB, CBA, and BAC, the positive phase sequence direction is CW. The resolver offset shift for CCW cases are constant regardless of rotor position. Therefore, if the high voltage cable misconnection cases are BCA or CAB which are of CWW types, the controller 100 may modify the default resolver offset $\theta_{off\_ABC}$ through the inverter 26 using the following equations respectively in order to operate electric machine 14 correctly:

$$\theta_{off\_BCA} = \theta_{off\_ABC} - 2/3\pi \quad (20)$$

$$\theta_{off\_CAB} = \theta_{off\_ABC} + 2/3\pi \quad (21)$$

For CW types of cable swaps which involves ACB, CBA, and BAC, the resolver offset shift are not constant, but varies as a function of rotor position $\theta_e$. Under these circumstances, accurate torque production cannot be maintained by simply modifying the resolver offset value. With reference to Table 2, it can be seen that for all three CW cases, the order of only two high voltage cables are incorrect. Therefore, the controller 100 may be configured to exchange the order of the two wrong phases corresponding to misconnection detection results to adjust the operation of the electric machine 14. Table 3 below illustrates the adjustment/compensation for each cable swap cases.

TABLE 3

Adjustment/Compensation for different types of cable swap

| Cable Swap Case | Adjustment/Compensation |
|---|---|
| ABC | Correct, no swap |
| BCA | Modify resolver offset $\theta_{off\_BCA} = \theta_{off\_ABC} - \frac{2}{3}\pi$ |
| CAB | Modify resolver offset $\theta_{off\_CBA} = \theta_{off\_ABC} + \frac{2}{3}\pi$ |
| ACB | Exchange order of phases B and C in software |
| CBA | Exchange order of phases A and C in software |
| BAC | Exchange order of phases A and B in software |

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an electric machine including a rotor;
a resolver associated with the electric machine; and
a controller programmed to,
inject a voltage signal to the electric machine to obtain a negative sequence current response of the electric machine to the voltage signal,
responsive to the negative sequence current response being indicative of a mismatched cable sequence and a position of the rotor being a multiple of 30°, inject a pulse torque command to the electric machine to obtain torque feedback of the electric machine to the pulse torque command, responsive to the torque feedback being indicative of rotation of the rotor, identify a first predefined cable sequence, responsive to the torque feedback being indicative of no rotation of the rotor, identify a second predefined cable sequence, responsive to the negative sequence current response being indicative of a mismatched cable sequence and a position of the rotor being other than a multiple of 30°, identify the first, second, or another predefined cable sequence, modify a default offset of the resolver based on the first, second, or another predefined cable sequence to generate a modified offset, and operate the electric machine and resolver with the modified offset.

2. The vehicle of claim 1, wherein the controller is further programmed to output a cable swapped diagnostic.

3. The vehicle of claim 1, wherein the voltage signal has a predetermined frequency and a predetermined magnitude such that the electric machine does not rotate responsive to application of the injected voltage signal.

4. The vehicle of claim 1 further comprising sensors configured to measure the negative sequence current response.

5. The vehicle of claim 1, wherein the controller has a switching frequency and a frequency of the injected voltage signal is in a range 10 to 20 times that of the switching frequency.

* * * * *